310-11 SR
FIP8502 OR 3,479,538
SEARCH ROOM

COMPOSITE-ELECTRODE FOR MAGNETOHYDRODYNAMIC GENERATOR

Filed May 18, 1966 6 Sheets-Sheet 1

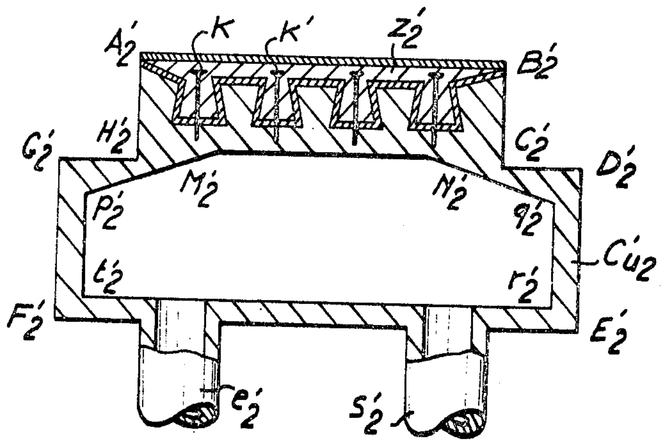
FIG. 2'a
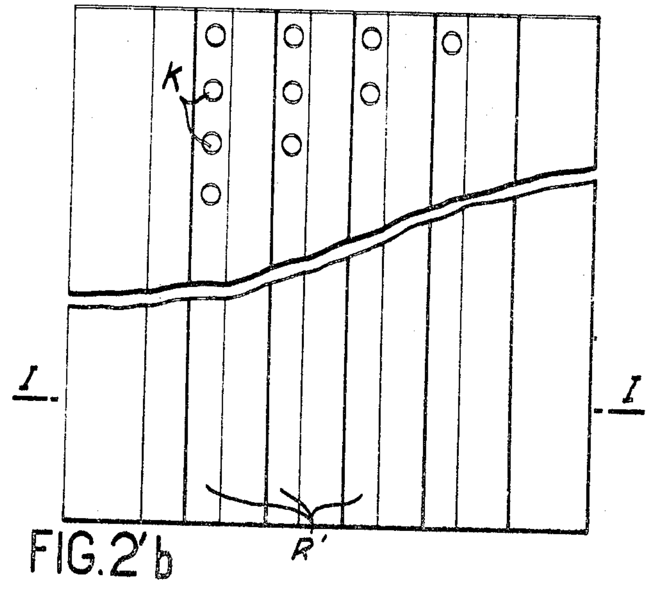
FIG. 2'b

Nov. 18, 1969 D. YEROUCHALMI 3,479,538

COMPOSITE-ELECTRODE FOR MAGNETOHYDRODYNAMIC GENERATOR

Filed May 18, 1966 6 Sheets-Sheet 3

COMPOSITE-ELECTRODE FOR MAGNETOHYDRODYNAMIC GENERATOR

Filed May 18, 1966 6 Sheets-Sheet 5

COMPOSITE-ELECTRODE FOR MAGNETOHYDRODYNAMIC GENERATOR

United States Patent Office 3,479,538
Patented Nov. 18, 1969

3,479,538
COMPOSITE-ELECTRODE FOR MAGNETOHYDRO-DYNAMIC GENERATOR

David Yerouchalmi, Issy-les-Moulineaux, France, assignor to Commissariat a l'Energie Atomique, Paris, France Filed May 18, 1966, Ser. No. 551,150
Claims priority, application France, May 25, 1965, 18,233
Int. Cl. H02k *45/00*; G21d *7/02*
U.S. Cl. 310—11 9 Claims

ABSTRACT OF THE DISCLOSURE

An electrode for an MHD generator has a refractory oxide surface in contact with the heated zone which surface is mounted on a thermally and electrically conductive metal box which is cooled by water. The metal box has a discontinuous upper surface and the refractory oxide is bonded thereto by a bonding layer and by fitting into the discontinuities of the surface, thus providing a mechanical connection and an electrical path.

Figure 1:
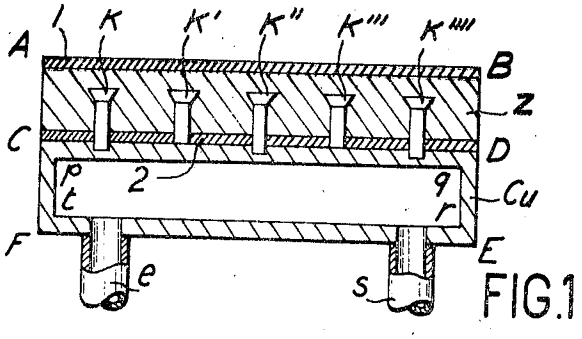

The present invention relates to a composite electrode which is designed to operate in a region in which very high temperatures are developed. The electrode according to the invention will be found useful and effective whenever it proves necessary to establish an electrical connection between a fluid at high temperature and a conductor at low temperature, as is the case with an open-cycle magnetohydrodynamic (MHD) generator.

In an open-cycle MHD generator, the plane faces of the electrodes which are subjected to the atmosphere of the combustion gases must withstand very high temperatures of the order of 2,000 to 3,000° K., and must also offer resistance to oxidizing atmosphere and to the alkaline vapors of the seeding material while at the same time introducing a negligible voltage drop across the flow of ionized gas as this latter is contacted with the electrodes. And it is accordingly necessary to ensure that at least those faces of said electrodes which are exposed to hot gases behave in a satisfactory manner over a long period of time.

The materials which can constitute the top face of an electrode are certain refractory oxides such as zirconia and thoria which are stabilized by a given percentage of calcium oxide, yttrium oxide or oxides of rare earths which also have the function of making the oxides of zirconium or of thorium more highly conductive at high temperature.

However, only the part which is sufficiently heated in these oxides is conductive; this is the case, for example, of MHD generators in which the electrode usually has the shape of a plate which is heated on one face, namely that face which is in contact with the ionized gas. Above a certain thickness, stabilized refractory oxide is no longer sufficiently hot to be electrically conductive.

The electrode in accordance with the present invention effectively circumvents the above disadvantages. Said electrode is characterized in that it comprises a first zone which is constituted by a refractory oxide and a second zone constituted by a thermally and electrically conductive metal box which is cooled by an internal flow of water, said box being separated from the first zone by a bonding layer and fitted with metallic members at the top portion thereof so as to provide a mechanical connection and an electrical path between the two zones.

The first zone is advantageously formed of an oxide of zirconium or of thorium which may if necessary be stabilized and blended with a doping agent with a view to enhancing their thermionic emissivity. Said first zone can also be formed of lanthanum chromite.

The second zone which is constituted by a cooled box of thermally and electrically conductive metal performs a triple function. In the first place, this zone provides a mechanical connection between the first conductive zone and the box by means of metallic members which are fixed on said box. This mechanical connection is also completed by a ceramic-metal contact. Furthermore, the physical and dimensional characteristics of the oxide portion and of the metallic unit which is constituted by the box and bonding members serve to determine the temperature which is best suited to the electrical oxide-metal path. Finally, by adapting the total composite thickness of the electrode to the thermal flux which is dependent on the mode of MHD operation envisaged, the electrode face which is in contact with the hot gases as well as the conductive wall as a whole can benefit by conditions which are compatible with their resistance to the various physical and mechanical stresses to which they are finally subjected.

A better understanding of this invention will be gained from the description which now follows, reference being made to the accompanying drawings in which a number of modes of application are shown by way of non-limitative example, and in which:

FIG. 1 is a general arrangement diagram of a composite electrode constituted by zirconium oxide and cooled metal or thorium oxide and cooled metal or lanthanum chromite and cooled metal as contemplated by the invention.

Figure 2A:
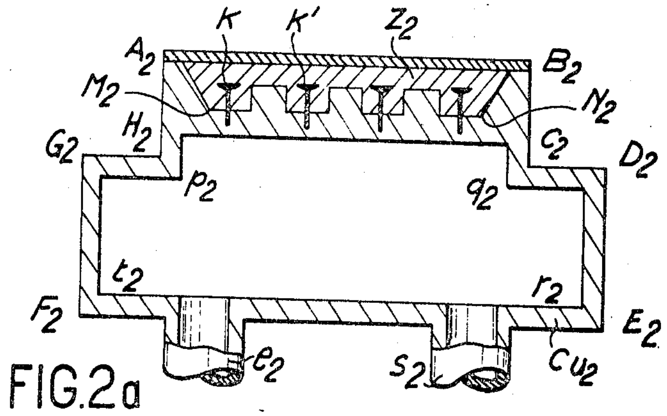
Figure 2B:
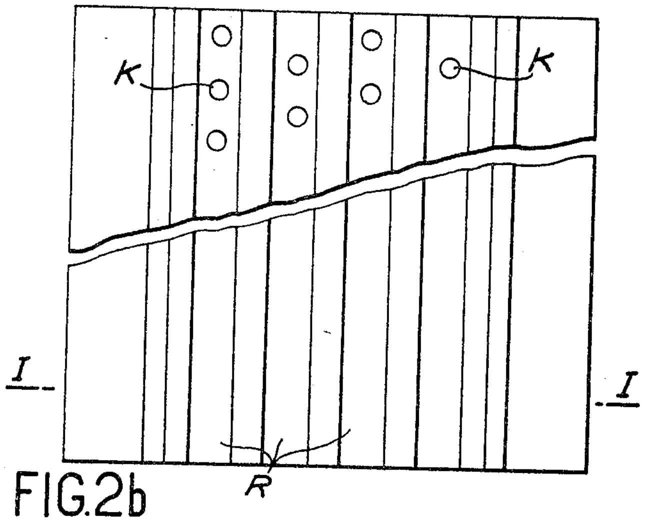

FIGS. 2*a'* and 2*b'* are similar to FIGS. 2*a* and 2*b* showing the channel as having a dovetail cross-section.

FIGS. 2*a*, 2*b*, 3*a*, 3*b*, 4*a* and 4*b* illustrate by way of non-limitative example different forms of construction of the composite electrode.

Figure 5A:
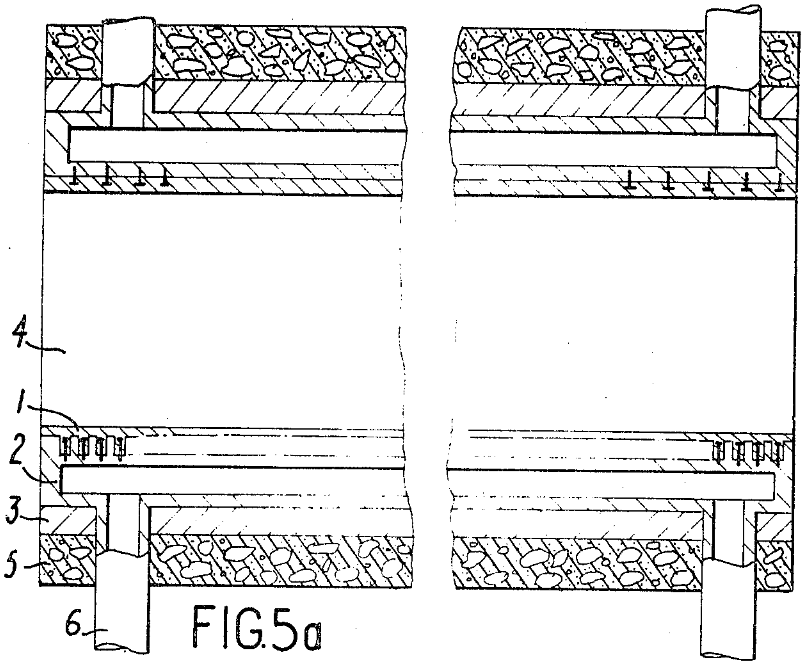
Figure 5B:
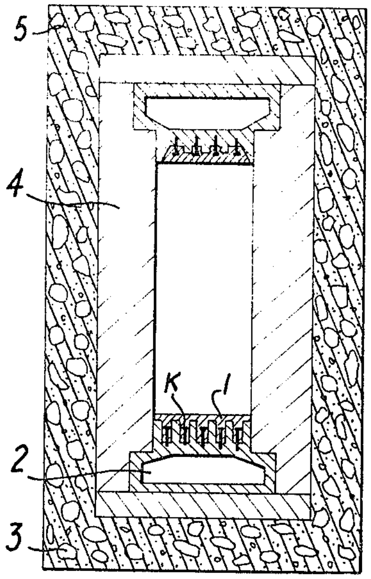

FIGS 5*a* and 5*b* represent respectively a longtitudinal cross-section and a transverse cross-section of an MHD generator in which use is made of an electrode in accordance with FIGS. 2*a* and 2*b*.

Figure 4A:
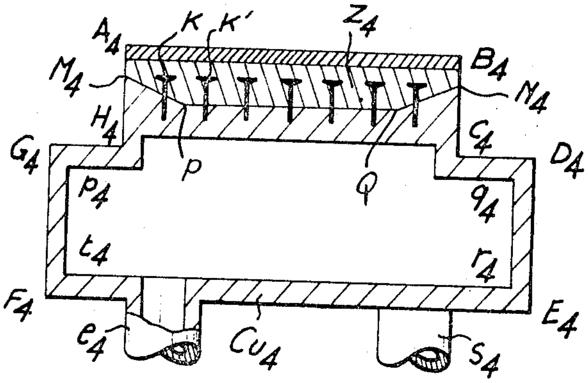
Figure 4B:
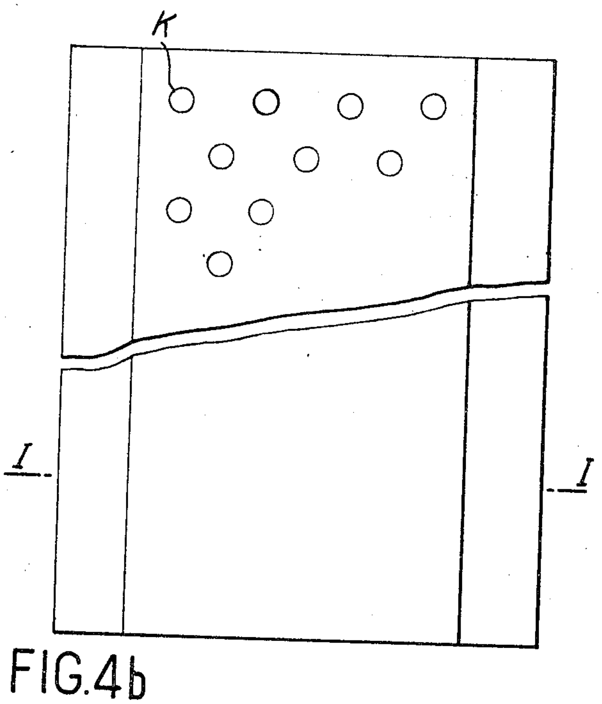
Figure 6A:
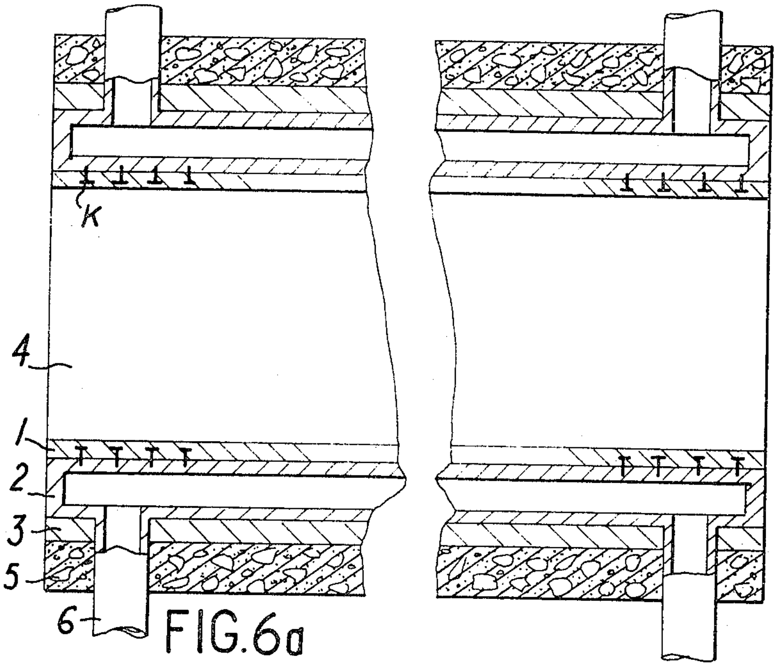
Figure 6B:
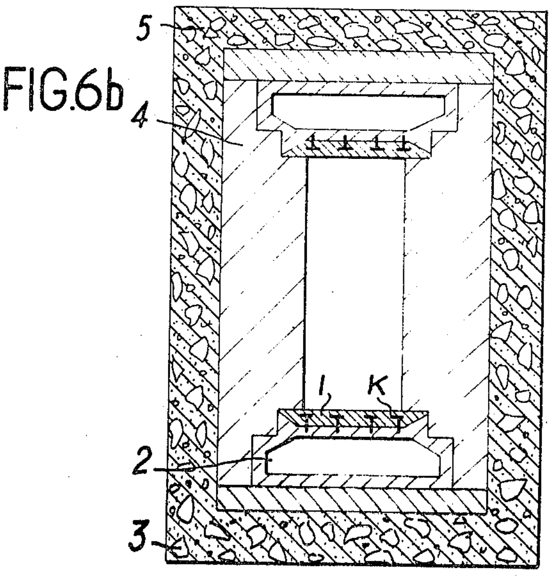

FIGS. 6*a* and 6*b* represent respectively a longitudinal cross-section and a transverse cross-section of an MHD generator in which use is made of an electrode in accordance with FIGS. 4*a* and 4*b*.

An electrode according to the invention will now be described in reference to FIG. 1.

Said electrode is made up of a small plate ABFE of parallelepipedal profile, AB being the face which is subjected to the hot gases. At a mean depth AC from the hot face AB, the value of which is a function of the temperature gradient, the electrode is divided by a line CD into two sections, namely one section ABCD which is formed either of a refractory oxide Z (zirconia, thoria) which may if necessary be stabilized and blended with a doping agent or of lanthanum chromite which is conductive at high temperature, and a second section CDEF which is formed by a box of cooled metal *Cu*. In addition, metallic members having good thermal and electrical conductivity such as K, K', K'', K''' are arranged in rows of four, five or six over the entire length of the electrode and fixed either mechanically or by welding in the portion CD of the box CDEF, the purpose of said members being to provide an electrical path as well as temperature regulation of the face AB which is exposed to the combustion gases. It will be apparent that the temperature regulation referred to is a function of the characteristics of the oxide ($ZrO_2$ or $ThO_2$) or of lanthanum chromite ($La_2O_3/CrO_3$), of the thickness AC of the first conductive zone, of the dimensions and number of the members K, as well as the materials of which they are made. There is applied along the line of separation of the two zones CD a bonding layer 2 which is formed of a carbide or a boride of the metal of the oxide Z or also of a noble refractory metal such as platinum, rhodium, iridium or their alloys, said layer being intended to establish a ceramic-to-metal contact and an electrical contact between Z and *Cu*.

The heated face AB will advantageously be covered with a layer 1 of a boride which has good thermionic emissivity such as zirconium diboride.

The application of the layers 1 and 2 can be effected by means of a brush or spray-gun, or by dipping with or without subsequent baking. The layer 2 can also be formed by a thin foil of noble refractory metal which is interposed between Z and *Cu* or by any other electrical contact means (conductive powders, wire gauze or lengths of wire).

A flow of cooling water is circulated within the bottom portion of the metal box *Cu* (*p*, *q*, *r*, *t*) and is admitted and discharged through the inlet and outlet *e* and *s* which also constitute lead-in ducts for the current supply cables.

FIGS. 2*a* and 2*b* represent respectively a transverse cross-section along the line I—I and an overhead plan view of a composite electrode in accordance with the invention. In this electrode, the refractory oxide $Z_2$ is poured in paste form into the top portion of a metal box $Cu_2$ which is provided with channels as shown at R. The bottom portions $A_2$, $M_2$, $N_2$, $B_2$ of the channels has been covered with the layer which serves to bond the face $A_2B_2$ which is coated with a thermionically emissive boride. K, K′, K″, K‴ are the metallic members which have good thermal and electrical conductivity.

FIGS. 2*a′* and 2*b′* represent an alternative form of the embodiment of FIGS. 2*a* and 2*b*, in which the channels R′ have a dovetailed cross-section.

Figure 3A:
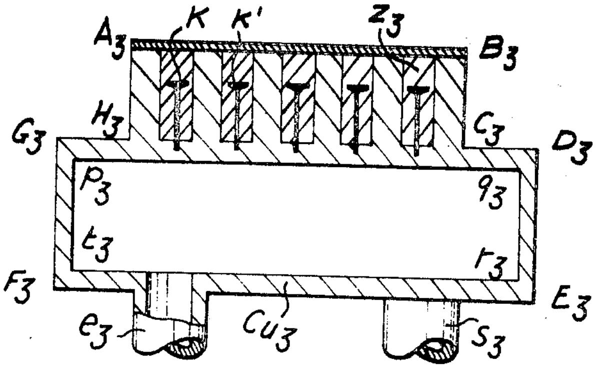
Figure 3B:
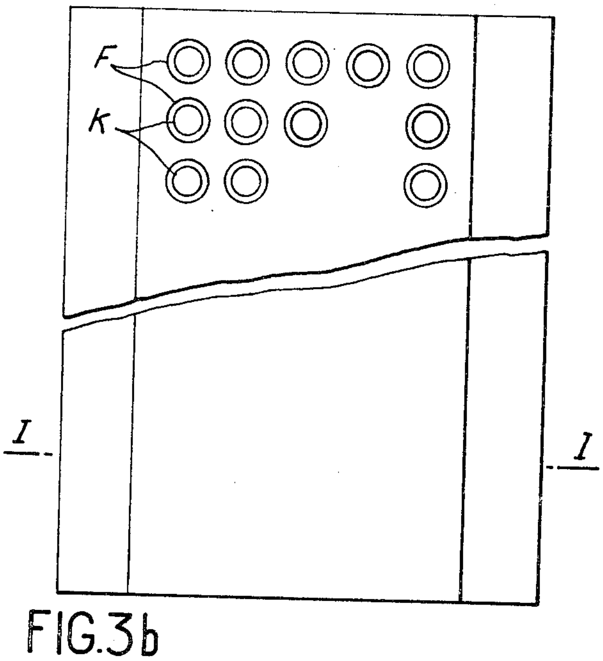

FIGS. 3*a* and 3*b* show an equivalent embodiment, in which the above-mentioned channels have been replaced by bored recesses F.

In FIG. 4*a*, the oxide $Z_4$ is a small plate of ceramic material which is cut according to a profile in which $A_4$–$B_4$–$N_4$–QP–$M_4$ is one non-limitative example and applied on the cooled metal box $Cu_4$. The surface $M_4$–PQ–$N_4$ is covered with a bonding layer and the heated face $A_4$–$B_4$ is covered with a layer of thermionically emissive boride. The metallic members K perform the same function as in the general example of FIG. 1, as do also the inlet and outlet $e_4$ and $s_4$.

FIGS. 5*a* and 5*b* represent respectively a longitudinal cross-section and a transverse cross-section of an MHD generator in which use is made of an electrode in accordance with FIGS. 2*a* and 2*b*. FIGS. 6*a* and 6*b* represent respectively a longitudinal cross-section and a transverse cross-section of an MHD generator which entails the use of an electrode in accordance with FIGS. 4*a* and 4*b*. In FIGS. 5*a*, 5*b*, 6*a* and 6*b*, the reference numerals from 1 to 6 designate:

1: refractory oxide Z;
2: metal box cooled by an internal circulation of water;
3: insulating refractory ceramic material;
4: insulating refractory ceramic material;
5: refractory concrete;
6: current lead-in ducts;
K: electrically and thermally conductive metallic bonding members.

The formation of the oxide Z can be carried out by any suitable means such as casting in a bubbling vessel, dry pressing and sintering, sintering under pressure, isostatic pressure and sintering with additions which are conducive to improved thermionic emissivity, better electrical conductivity and better compatibility of the materials Z and *Cu*.

It is apparent that this invention is not limited to the forms of embodiment herein described but extends to all alternative forms which come within the definition of equivalent means.

What I claim is:

1. Composite electrode for use in the channel of a magnetohydrodynamic converter comprising a first conductive zone formed of a refractory oxide and a second zone constituted by a thermally and electrically conductive metal box which is cooled by an internal flow of water, said box being separated from the first zone by a discontinuous surface and a bonding layer and fitted with metallic members at the top portion thereof, said refractory oxide fitting into said discontinuous surface so as to provide a mechanical connection and an electrical path between the two zones.

2. Electrode in accordance with claim 1, the first zone being a refractory oxide selected from the group consisting of zirconia, thoria and lanthanum chromite.

3. Electrode in accordance with claim 1, the heated face of the electrode being coated with a boride which has good thermionic emissivity.

4. Electrode in accordance with claim 1, the bonding layer being a carbide or a boride of the metal of the oxide which constitutes the first zone.

5. Electrode in accordance with claim 1, the bonding layer being a noble refractory metal selected from the group consisting of platinum, rhodium, iridium or alloys of these metals.

6. Electrode in accordance with claim 1, said discontinuous surface having channels in the top portion receiving the refractory metal oxide in paste form.

7. Electrode in accordance with claim 1, including channels in said discontinuous surface having a dovetail cross-section.

8. Electrode in accordance with claim 1, including circular recesses in said discontinuous surface.

9. Electrode in accordance with claim 1, said surface having a trapezoidal cross-section.

References Cited

UNITED STATES PATENTS

| | | | |
|---|---|---|---|
| 3,149,253 | 9/1964 | Luebke | 310—11 |
| 3,165,652 | 1/1965 | Prater | 310—11 |
| 3,233,127 | 2/1966 | McKechnie | 310—11 |
| 3,319,091 | 5/1967 | Burhorn et al. | 310—11 |

DAVID X. SLINEY, Primary Examiner

U.S. Cl. X.R.

313—311